United States Patent [19]
Katori et al.

[11] Patent Number: 5,995,248
[45] Date of Patent: *Nov. 30, 1999

[54] IMAGE FORMING DEVICE AND METHOD HAVING MTF CORRECTION

[75] Inventors: Kentro Katori, Toyokawa; Yoshinobu Hada, Aichi-ken; Masahiro Kouzaki, Gamagori; Yukihiko Okuno; Katsuyuki Hirata, both of Toyokawa, all of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/821,364

[22] Filed: Mar. 20, 1997

[30] Foreign Application Priority Data

Mar. 22, 1996 [JP] Japan .................................. 8-066648

[51] Int. Cl.$^6$ ........................................................ H04N 1/46
[52] U.S. Cl. .................... 358/501; 358/401; 358/406; 358/443; 358/448; 358/455; 358/456; 358/530; 358/532; 358/538; 382/167; 382/274
[58] Field of Search .................................... 358/406, 447, 358/462, 401, 504, 501, 456, 298, 459, 443, 448, 532, 538, 530; 382/167, 274

[56] References Cited

U.S. PATENT DOCUMENTS

| | | | |
|---|---|---|---|
| 4,620,237 | 10/1986 | Traino et al. | 358/206 |
| 4,751,377 | 6/1988 | Ishizaka et al. | 250/205 |
| 4,878,125 | 10/1989 | Katayama et al. | 358/443 |
| 4,907,288 | 3/1990 | Shimoni | 382/6 |
| 4,958,221 | 9/1990 | Tsuboi et al. | 358/406 |
| 5,357,353 | 10/1994 | Hirota | 358/530 |
| 5,416,613 | 5/1995 | Rolleston et al. | 358/506 |
| 5,452,112 | 9/1995 | Wan et al. | 358/501 |
| 5,508,826 | 4/1996 | Lloyd et al. | 358/504 |

FOREIGN PATENT DOCUMENTS

| | | |
|---|---|---|
| 59-067780 | 4/1984 | Japan . |
| 61-080960 | 4/1986 | Japan . |
| 61-080965 | 4/1986 | Japan . |
| 61-080968 | 4/1986 | Japan . |
| 59-244273 | 6/1986 | Japan . |
| 4-342370 | 11/1992 | Japan . |

*Primary Examiner*—Christopher S. Kelley
*Assistant Examiner*—Sheela Chawan
*Attorney, Agent, or Firm*—Sidley & Austin

[57] ABSTRACT

A test pattern comprising a half-tone pattern portion and an edge pattern portion printed according to standard printing data is read by a CCD sensor. A pattern discriminator detects the positions of the half-tone pattern portion and the edge pattern portion. In accordance with a prescribed edge detection criteria using the primary differential data $\Delta D$ of density determined by primary differential filters, the CPU determines whether the inputted image data correspond to a uniform density region or whether the inputted image data correspond to an edge portion. If the region discrimination result is different from the result of the pattern detection, the edge detection criteria are changed. The image data is then subjected to MTF correction, and conditions for smoothing or edge emphasizing are altered so that the difference between the corrected image data and the standard printing data remains within a allowable range.

16 Claims, 11 Drawing Sheets

FIG. 6

| 0 | 0 | −1/4 | 0 | 0 |
|---|---|---|---|---|
| 0 | 0 | 0 | 0 | 0 |
| −1/4 | 0 | 1 | 0 | −1/4 |
| 0 | 0 | 0 | 0 | 0 |
| 0 | 0 | −1/4 | 0 | 0 |

| −1/8 | 0 | 0 | 0 | 1/8 |
|---|---|---|---|---|
| −1/8 | −1/8 | 0 | 1/8 | 1/8 |
| −1/8 | −1/8 | 0 | 1/8 | 1/8 |
| −1/8 | −1/8 | 0 | 1/8 | 1/8 |
| −1/8 | 0 | 0 | 0 | 1/8 |

| −1/8 | −1/8 | −1/8 | −1/8 | 1/8 |
|---|---|---|---|---|
| 0 | −1/8 | −1/8 | −1/8 | 0 |
| 0 | 0 | 0 | 0 | 0 |
| 0 | 1/8 | 1/8 | 1/8 | 0 |
| 1/8 | 1/8 | 1/8 | 1/8 | 1/8 |

612

FIG. 10(a) ORIGINAL IMAGE
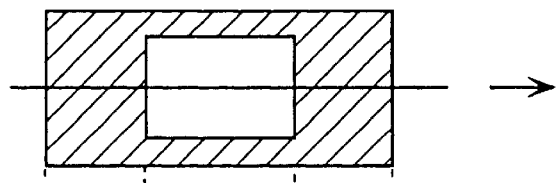
FIG. 10(b) DENSITY DISTRIBUTION
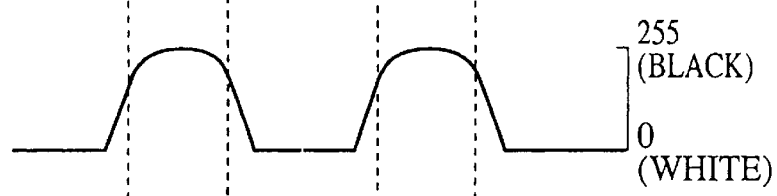
FIG. 10(c) PRIMARY DIFFERENTIAL OUTPUT
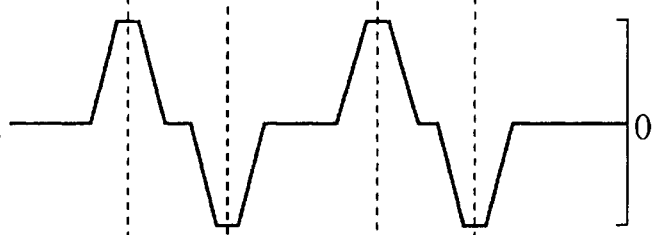
FIG. 10(d) ABSOLUTE VALUE OF PRIMARY DIFFERENTIAL OUTPUT
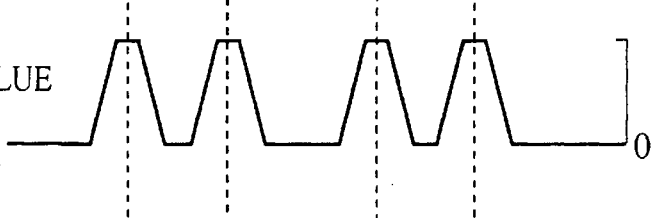
FIG. 10(e) BRIGHTNESS DISTRIBUTION
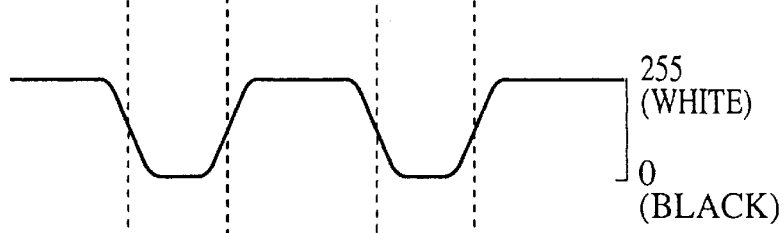
FIG. 10(f) LAPLACIAN OUTPUT
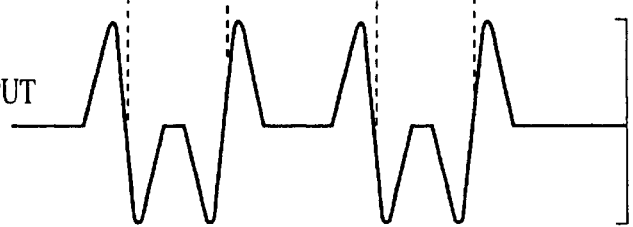

FIG. 11(a)

| 1/32 | 1/16 | 1/32 |
|------|------|------|
| 1/16 | 5/8  | 1/16 |
| 1/32 | 1/16 | 1/32 |

| 1/16 | 1/8 | 1/16 |
|------|-----|------|
| 1/8  | 1/4 | 1/16 |
| 1/16 | 1/8 | 1/16 |

| 1/100 | 1/50 | 1/25 | 1/50 | 1/100 |
|-------|------|------|------|-------|
| 1/50  | 1/25 | 2/25 | 1/25 | 1/50  |
| 1/25  | 2/25 | 4/25 | 2/25 | 1/25  |
| 1/50  | 1/25 | 2/25 | 1/25 | 1/50  |
| 1/100 | 1/50 | 1/25 | 1/50 | 1/100 |

623

REFLECTANCE DATA

DENSITY DATA

PRIMARY DIFFERENTIAL DATA

IMAGE FORMING DEVICE AND METHOD HAVING MTF CORRECTION

BACKGROUND OF THE INVENTION (1) Field of the Invention

The present invention relates to an image forming apparatus, such as a digital color copying machine and a color facsimile machine, which reproduces a full-color image according to image data obtained by reading an original image.

(2) Related Art

In a copying machine which reproduces an image according to image data obtained by reading an original with a scanner, the digital image data of red (R), green (G), and blue (B), obtained from an original, are transformed into color reproduction data of cyan (C), magenta (M), and yellow (Y) by an image signal processing unit. According to the color reproduction data, an image is formed on a printing paper by a printer.

During the data processing, however, image noise is caused by low scanning accuracy, poor color reproducibility of the printer, and other factors, and that is why an image forming machine needs a correction unit.

In a full-color reproduction image, unevenness is very noticeable in a uniform density region, where smoothness is an important factor as well as resolution. If the resolution is emphasized, however, the unevenness stands out even more in a uniform density region and makes the whole image unnatural. If smoothness is emphasized, the edge portion is blurred and the result is very poor resolution.

Japanese Laid-Open Patent Application No. 4-342370 discloses an image processing method in which the edge portions and the uniform density regions are discriminated depending on changes in lightness. Here, the image data of the edge portions are subjected to edge emphasizing by an MTF (modulation transfer function) correction unit to reproduce a clearer image, while the image data of the uniform density regions are subjected to smoothing to obtain a smoother image. By doing so, both resolution and smoothness are improved, and image noise is reduced.

The conditions for MTF correction are optimized at the time of assembling or shipping of the copying machine.

The actual image quality, however, is not always as good as expected, despite the fact that the MTF corrective conditions have already been optimized at the time of assembling or shipping.

This is mainly because each component deteriorates with time. More specifically, the deterioration is due to declines in the sensitivity of the CCD image sensor, the irradiation by the exposure lamp, the sensitivity of the photosensitive drum, and the sensitizing ability of the sensitizing charger. The influence from a change in the surroundings and the characteristics of each copying machine may also be the cause of the deterioration.

In such case, optimizing the MTF corrective conditions is difficult, because it requires skill and complicated modulation processes.

SUMMARY OF THE INVENTION

The object of the present invention is to provide an image forming apparatus which optimizes MTF corrective conditions with ease by eliminating image deterioration caused by an image quality change with time, or a change in the surroundings, or the characteristics of each copying machine.

To achieve the above object, the image forming apparatus of the present invention performs MTF correction on image data obtained by reading an original and forms an image according to the corrected image data, and comprises: a storage unit for storing the printing data of a test pattern; an image reading unit for reading an image of the test pattern formed in accordance with the printing data; a comparator for comparing the image data of the test pattern obtained by the image reading unit with the printing data; an MTF corrective condition optimizing unit for optimizing the MTF corrective conditions in accordance with the comparison result so that the difference between the test pattern image data and the printing data remains within a predetermined range; and an MTF correction unit for performing MTF correction on the original image data in accordance with the optimized MTF corrective conditions. A copying method using the image forming apparatus of the present invention comprises the steps of: (1) reading the printing data of the test pattern stored in a memory, and forming the test pattern image according to the printing data; (2) reading an image of the test pattern formed in step (1) to obtain the image data of the test pattern; (3) optimizing the MTF corrective conditions by comparing the test pattern image data obtained in step (2) with the test pattern printing data stored in the memory; (4) reading an original to obtain the original image data; (5) performing MTF correction on the original image data in accordance with the MTF corrective conditions optimized in step (3); and (6) forming an image according to the original image data which have been subjected to MTF correction.

According to the present invention, the test pattern is formed according to the standard printing data, and the image data obtained by reading the test pattern are compared with the standard printing data. As the MTF corrective conditions are changed so that the difference between the test pattern image data and the standard printing data is within a predetermined range, the MTF corrective conditions can be optimized easily and an image can be formed with excellent reproducibility.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 6 shows an example Laplacian filter set in the Laplacian converter.

FIGS. 7(a)–7(b) show example primary differential filters set in the primary differential filter unit.

FIGS. 10(a)–10(f) show the density distribution and the lightness distribution in edge portions, the primary differential values, and the variation of the Laplacian data.

FIGS. 11(a)–11(c) show three types of example smoothing filters set in the MTF correction unit.

DESCRIPTION OF THE PREFERRED EMBODIMENTS

The following is an explanation of the embodiment of the image forming apparatus of the present invention applied to a digital color copying machine.

(1) Overall Structure of the Digital Color Copying Machine

Figure 1:
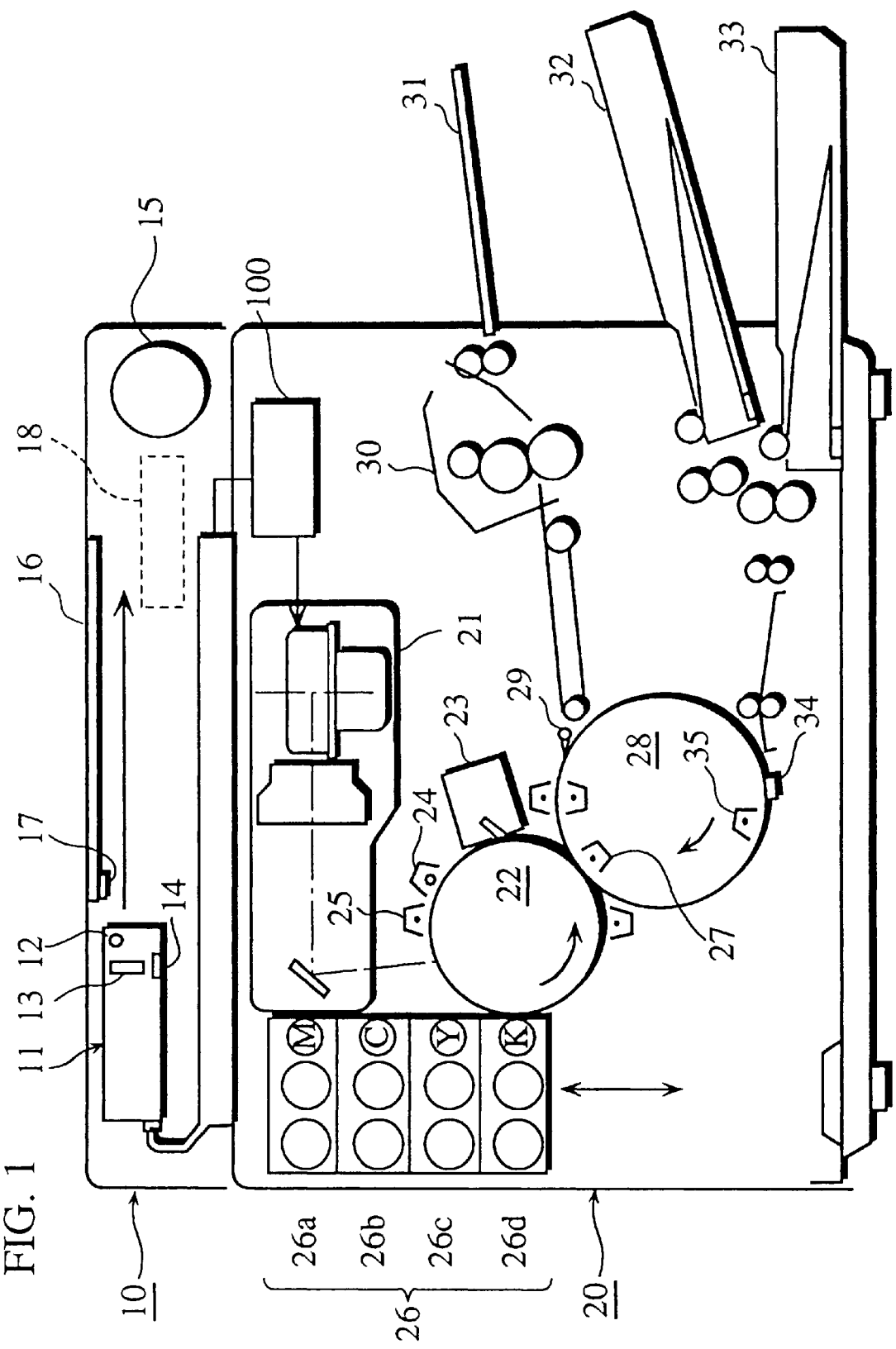
FIG. 1 shows the overall structure of a digital color copying machine of the present invention.

FIG. 1 shows the overall structure of the digital color copying machine of the present invention.

The digital color copying machine mainly comprises an image reading unit 10 for reading an original image and a printing unit 20 for reproducing the image read by the image reading unit 10.

A scanner 11 in the image reading unit 10 includes an exposure lamp 12 for irradiating an original, a rod lens array 13 for gathering reflection light from the original, and a contact-type CCD color image sensor 14 (hereinafter referred to simply as a CCD sensor 14) for transforming the gathered light into electric signals.

When reading an original, the scanner 11 is driven by a motor 15 and moves in the direction of the arrow in FIG. 1 to scan the original placed on a transparent original glass plate 16. The CCD sensor 14 is provided with filters for red (R), green (G), and blue (B). With these filters, the three-color data are read from the original image by scanning.

Figure 2:
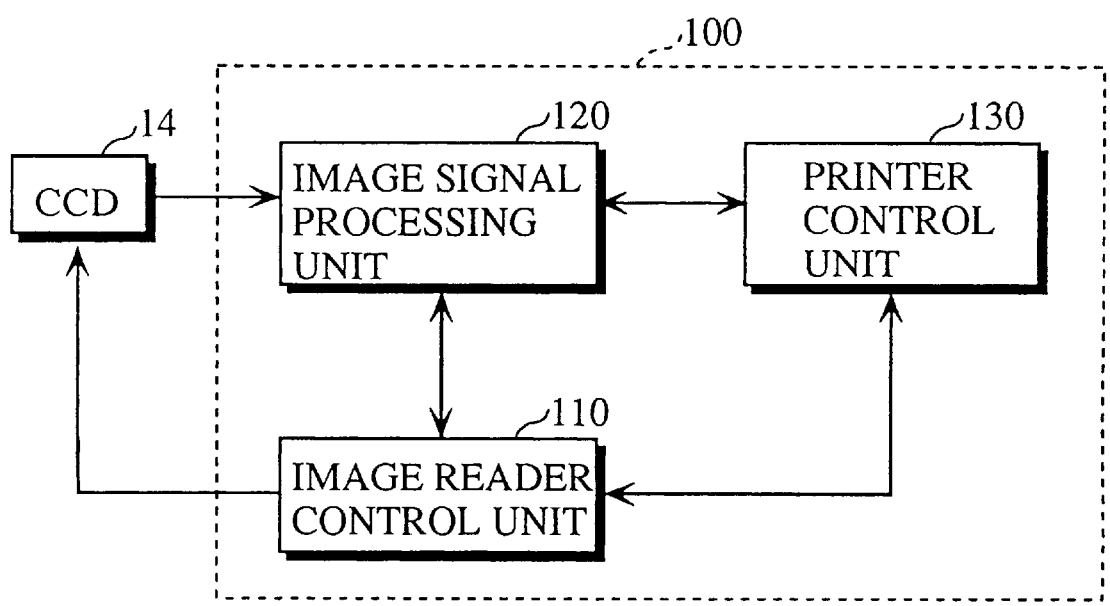
FIG. 2 is a diagram of the control unit in the digital color copying machine.

The reflection light obtained by irradiating the surface of an original by the exposure lamp 12 in the scanner are photoelectrically converted by the CCD sensor 14 into multi-valued electric signals of red (R), green (G), and blue (B), which are then converted into gradation data of cyan (C), magenta (M), yellow (Y), and black (K) by an image signal processing unit 120 in a control unit 100 (both shown in FIG. 2).

The gradation data are outputted to a printer control unit 130 (also shown in FIG. 2) in the control unit 100, where they are subjected to gamma correction and dither correction, if necessary, in accordance with the gradation characteristics of the photosensitive member. A printer head unit 21 containing a laser diode exposes the surface of a photosensitive member 22 for each color.

Prior to the exposure, the remaining toners on the surface of the photosensitive drum 22 have been removed by a cleaner 23, and the photosensitive drum 22 has been irradiated by an eraser lamp 24 and charged uniformly by a sensitizing charger 25. When the exposure is performed on the photosensitive member in the uniformly charged state, an electrostatic latent image is formed on the surface of the photosensitive drum 22.

A toner developing unit 26 provided with toner developers 26a–26d corresponding to cyan (C), magenta (M), yellow (Y), and black (K) is moved up and down by an elevating unit (not shown) in synchronization with the rotation of the photosensitive drum 22. One of the toner developers 26a–26d having the color corresponding to the formed electrostatic latent image is selected to develop the electrostatic latent image onto the surface of the photosensitive drum 22.

Meanwhile, a transfer drum 28 is supplied with a copying paper of a suitable size (not shown) from a selected paper cassette 32 or 33. The front edge of the copying paper is held by a chucking mechanism 34 disposed on the transfer drum 28, and electrostatically pulled by a suction charger 35 so that the copying paper does not slip on the transfer drum 28. The toner image developed on the photosensitive drum 22 is transferred to the copying paper on the transfer drum 28 by a transfer charger 27.

The above printing process is repeated for all the colors, cyan (C), magenta (M), yellow (Y), and black (K), and when the printing of all the colors has been completed, a separation claw 29 is activated to separate the copying paper from the surface of the transfer drum 28.

Since the toner image transferred onto the copying paper can be easily removed, the toners are fixed onto the surface of the copying paper by heating and pressing with a fixing unit 30. The copying paper with the fixed toner image is then discharged onto a paper tray 31.

An operation panel 18 is disposed on the front side of the image reading unit 10 so that is it easy for users to operate. The operation panel 18 comprises a 10-keypad for inputting the number of copies to be made, a start key for starting the operation, and a test pattern print key.

The following is an explanation of the structure of the control unit 100 of the digital color copying machine, with reference to the block diagram of FIG. 2.

The control unit 100 consists of an image reader control unit 110, an image signal processing unit 120, and a printer control unit 130.

The image reader control unit 110 controls the operations of the image reading unit 10 when reading an original. These operations include the switching of the CCD sensor 14 and the exposure lamp 12, and the driving of the scanner 11 by the motor 15.

The image signal processing unit 120 processes the image data of red (R), green (G), and blue (B) sent from the CCD sensor 14 in the scanner 11, and transforms the image data into the image data of the reproduction colors, cyan (C), magenta (M), yellow (Y), and black (K), to achieve the optimum reproduction images.

The printer control unit 130 controls the operation of each part of the printing unit 20. It performs gamma correction on the image data outputted from the image signal processing unit 120, performs dither processing when a multi-valued dither method is used as a gradation expressing technique, and controls the output of the printer head unit 21. The printer control unit 130 also controls the synchronization of the following actions: the paper supply from the paper cassette 32 or 33; the rotation of the photosensitive drum 22 and the transfer drum 28; the vertical movement of the toner developing unit 26; and the charge supply for each charger.

In response to an instruction from the user, the printing unit 20 prints a test pattern, on copying paper which is used as the standards for the MTF corrective condition change mentioned later.

(2) Structure of the Image Signal Processing Unit

Figure 3:
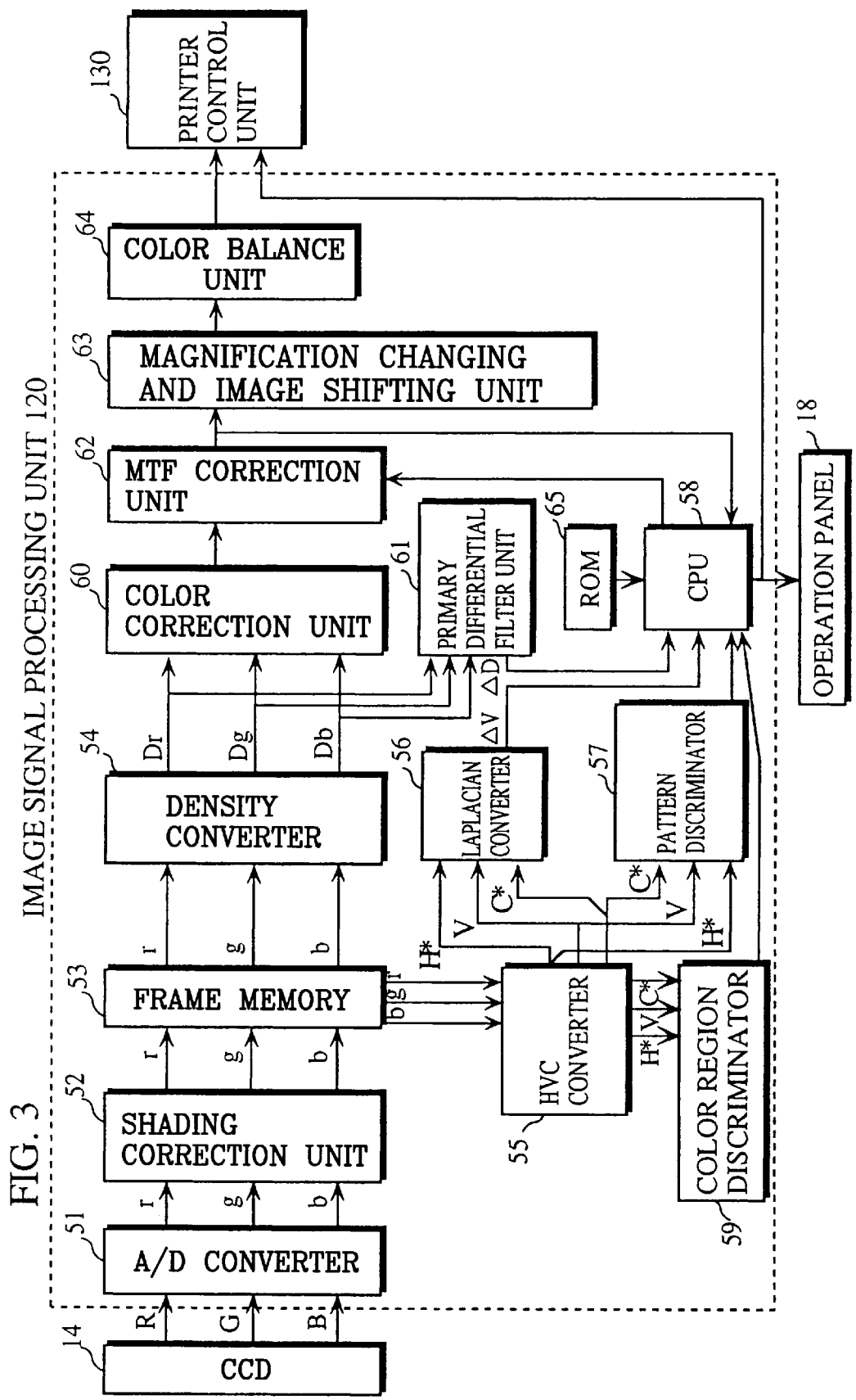
FIG. 3 is a block diagram of the image signal processing unit of the digital color copying machine.

The following is an explanation of the structure of the image signal processing unit 120, with reference to the block diagram in FIG. 3.

The image signals photoelectrically converted by the CCD sensor 14 in the scanner 11 are further converted into multi-valued digital image data of R, G, and B by an A/D convertor 51.

The A/D converted image data are then subjected to shading correction by a shading correction unit 52. This shading correction is aimed at correcting uneven irradiation by the exposure lamp 12 and irregular sensitivity of the CCD sensor 14. A white standard plate 17 (shown in FIG. 1) disposed at an edge portion of the original glass plate 16 is pre-scanned to obtain the image data of the standard white. Here, a multiplication ratio for each pixel is determined according to the image data of the white standard plate 17, and then stored in the internal memory of the shading correction unit 52. After reading an original, corrections are performed by multiplying each pixel data by the multiplication ratio stored in the internal memory.

Each of the image data of r, g, and b, which have been subjected to the shading correction, is temporarily stored in a frame memory 53, and then sent to a density converter 54 and an HVC converter 55.

The density converter 54 converts the image data R, G, and B into density data Dr, Dg, and Db.

The conversion is necessary, because the image data right after the shading correction are still the reflectance data of an original and need to be converted into the density data of the actual image.

Figure 4:
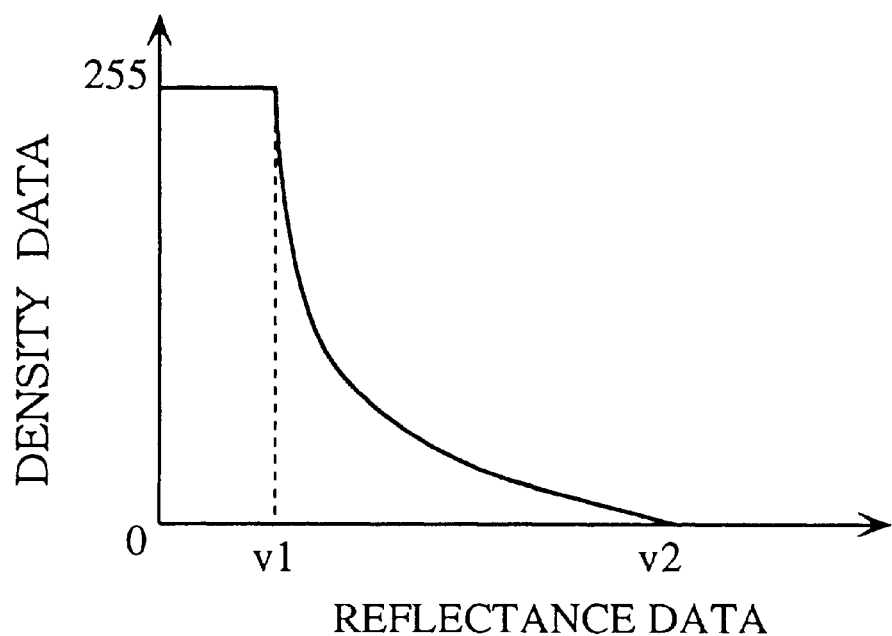
FIG. 4 shows the relationship between reflectance data and density data.

The CCD sensor 14 has photoelectric conversion characteristics the output of which is proportional to the incident strength (the reflection ratio of the original). The relationship between the original reflection ratio and the original density can be represented by a logarithmic curve shown in FIG. 4. In this figure, the abscissa axis indicates the value of the reflectance data, while the ordinate axis indicates the value of the density data. According to this logarithmic curve, the minimum value v1 to the maximum value v2 of the reflectance data are converted into density data, and the maximum density gradation value of the density data is 255. Thus, the density data DR, DG, and DB which are proportional to the original density can be obtained.

Meanwhile, the image data sent to the HVC converter 55 are converted into color region signals of hue (H*), brightness (V), and saturation (C*) in an HVC color space.

The image data of R, G, and B are converted into the color region signals v, $\alpha$, and $\beta$ by Equation (1), and according to $\alpha$ and $\beta$, the values of the saturation (C*) and the hue (H*) are determined.

$$\begin{pmatrix} v \\ \alpha \\ \beta \end{pmatrix} = \begin{pmatrix} a_{11} & a_{12} & a_{13} \\ a_{21} & a_{22} & a_{23} \\ a_{31} & a_{32} & a_{33} \end{pmatrix} \times \begin{pmatrix} r \\ g \\ b \end{pmatrix} \quad (1)$$

The conversion coefficients of Equation (1) up of 3×3 elements $a_{11}$–$a_{33}$ are predetermined from the transmission characteristics of the filters for color separation. Equation (2) shows an example of the conversion coefficients.

$$\begin{pmatrix} 0.3 & 0.6 & 0.1 \\ 1.0 & -0.8 & 0.1 \\ -0.3 & -0.6 & 1.0 \end{pmatrix} \quad (2)$$

Figure 5:
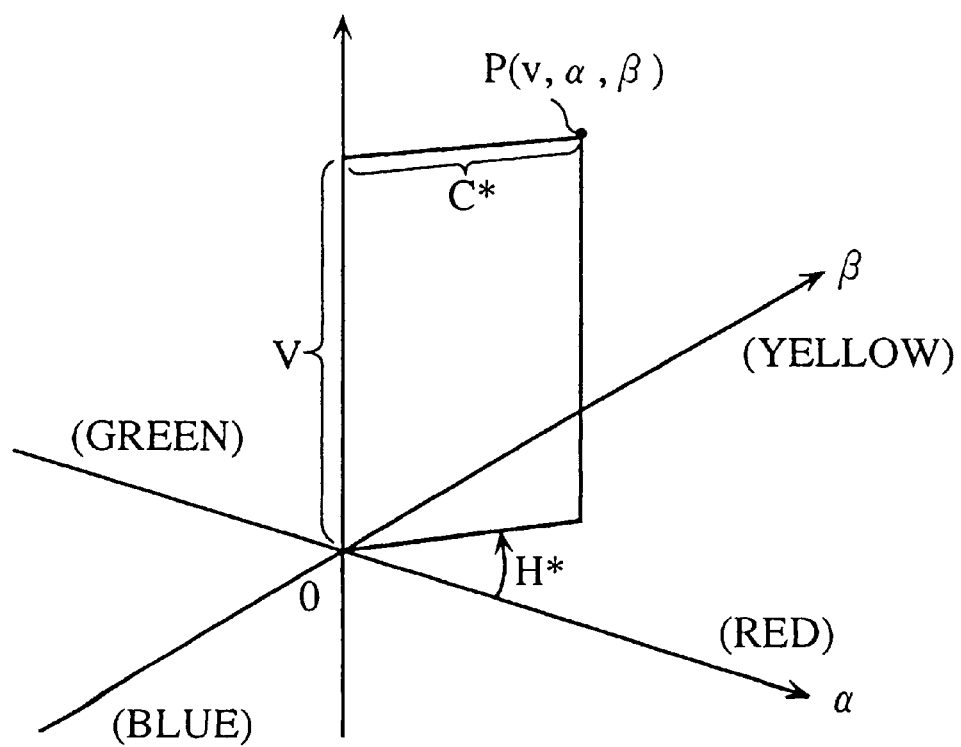
FIG. 5 shows a coordinate system in an HVC color space.

FIG. 5 shows a coordinate system in the HVC color space, in which the ordinate axis represents lightness, and the other two transverse axes represent color tone. An axis $\alpha$ represents the degree of red in the positive direction and the degree of green in the negative direction. An axis $\beta$ represents the degree of yellow in the positive direction and the degree of blue in the negative direction. The brightness (V) at point P in the color space is equal to v, and saturation (C*) and hue (H*) can be determined by the following Equations (3) and (4).

$$C^* = (\alpha^2 + \beta^2)^{1/2} \quad (3)$$

$$H^* = (^{256}/_{360}) \times \tan^{-1}(\beta/\alpha) \quad (4)$$

The hue (H*) is generally indicated by the angles of 0° to 360°, but in Equation (3) the hue (H*) can be represented in 256 levels (8-bit) by multiplying the angles by the coefficient of (256/360).

The color region signals of saturation (C*), brightness (V), and hue (H*) determined by the HVC converter 55 are outputted to a Laplacian converter 56, a pattern discriminator 57, and a color region discriminator 59.(see FIG. 3)

The Laplacian converter 56 subjects the image data of the brightness (V) of a central pixel and its periphery pixels to filtering using a Laplacian filter 561 shown in FIG. 6, and sends the output of the Laplacian filter 561 to the CPU 58 as Laplacian data $\Delta$V.

The color region discriminator 59 determines the color region of the image data according to the color region signals of H*, V, and C*. More specifically, on the $\alpha\beta$ plane in the HVC color space shown in FIG. 5, the hue circle is divided into three parts corresponding to C, M, and Y, and the color region of the image data is judged from the hue (H*). If the saturation (C*) is "0", the image data is judged to belong to the color region of K (in other words, the achromatic color region), and the result is outputted to the CPU 58 as color region information.

In the case where the MTF corrective condition change mode is set from the operation panel 18, the pattern discriminator 57 detects the position of each individual pattern of a test pattern in accordance with the values of H*, V, and C* in the image data obtained by reading the image of the test pattern set as an original, and the detected result is sent to the CPU 58 as position information. The CPU 58 in turn changes the MTF corrective conditions according to the position information, a process which will be described later in the specification. The following is an explanation of the reproduction of a normal image in the case where the change mode has not been set.

At the time of the HVC conversion described above, the density data Dr, Dg, and Db obtained by the density converter 54 are inputted into both a color correction unit 60 and a primary differential filter unit 61.

The color correction unit 60 conducts black paint process (BP process) in which a predetermined portion of the greatest common measure among the density data Dr, Dg, and Db is determined to be the black density data K, while it also conducts undercolor removal process (UCR process) in which a predetermined portion of the black density data K is subtracted from each of the density data Dr, Dg, and Db.

The generation of the black color density in the BP process is necessary, because pure black is hard to reproduce by the overlapping of C, M, and Y toners, due to the adverse influence of the spectral characteristics of each toner, from this point of view, pure black is reproduced using the toner of K based on the density value.

Since the reproduction colors, C, M, and Y, are complementary to the primary colors, R, G, and B, two corresponding colors should have the same density. In practice, however, the transmission characteristics of the filters for R, G, and B in the CCD sensor 14 do not change proportionally to the reflection characteristics of the toners of C, M, and Y in the printing unit. Therefore, it is necessary to perform linear correction to match both characteristics with one another, so that the color reproducibility becomes as high as possible.

The density data values Dr', Dg', and Db' obtained through the UCR process are subjected to linear correction according to a linear masking equation shown by the following Equation (6) using a masking coefficient M shown by Equation (5) to determine the density data of the reproduction colors, C, M, and Y:

$$M = \begin{pmatrix} m_{11} & m_{12} & m_{13} \\ m_{21} & m_{22} & m_{23} \\ m_{31} & m_{32} & m_{33} \end{pmatrix} \quad (5)$$

$$\begin{pmatrix} C \\ M \\ Y \end{pmatrix} = M \begin{pmatrix} C' \\ M' \\ Y' \end{pmatrix} \quad (6)$$

Each element $m_1 1$-$m_{33}$ of the masking coefficient M in Equation (5) is determined from the transmission characteristics of the filters and the reflection characteristics of the toners.

Having been determined in the BP process, the black density data K does not need to be converted and remains black data K.

The density data of the reproduction colors, C, M, Y, and K, are outputted to an MTF (modulation transfer function) correction unit 62 and subjected to MTF correction. Prior to that, the CPU 58 determines the color region of the image data in the following manner.

Firstly, the primary differential data $\Delta D$ of the density data Dr, Dg, and Db outputted from the density converter 54 is determined by the primary differential filter unit 61, which calculates the average of the density data Dr, Dg, and Db for each pixel and subjects the average density value to filtering using longitudinal and transverse primary differential filters 611 and 612 (shown in FIGS. 7(a)–7(b)) to determine a longitudinal primary differential value $\Delta Dv$ and a transverse primary differential value $\Delta Dh$. The absolute value of the average of the two primary differential values is determined by $(|\Delta DV|+|\Delta Dh|)/2$, and sent to the CPU 58 as the primary differential data $\Delta D$.

Figure 8:
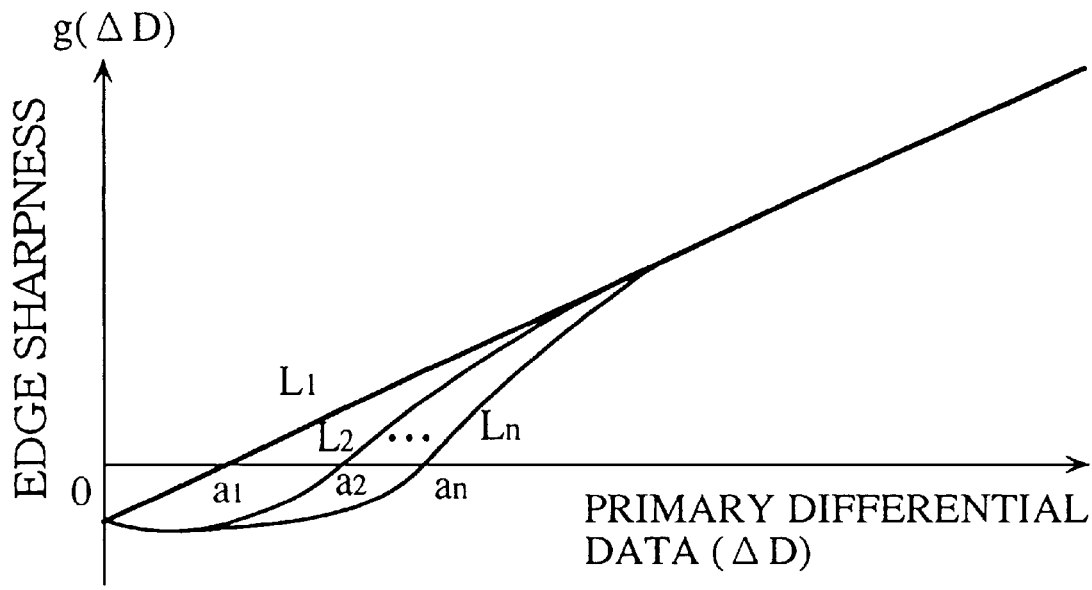
FIG. 8 shows an edge detection function g($\Delta$D) set in the CPU.

As the density variation is greater in an edge portion of an image, the CPU 58 determines whether the image data belong to an edge portion or whether the image data belong to a uniform density region according to the primary differential data $\Delta D$. Here, a characteristic curve for edge detection shown in FIG. 8 is used.

In this figure, the abscissa axis indicates the value of the primary differential data $\Delta D$, while the ordinate axis indicates where a portion is judged to be an edge portion (i.e., the ordinate axis indicates the edge sharpness).

Here, g indicates a function represented by the characteristic curve, and when $g(\Delta D)$ is larger than 0, the image data are judged to belong to an edge portion.

The characteristic curve is predetermined statistically and experimentally from the image resolution of the copying machine or image quality of the original. The threshold value $a_n$ (n=1, 2, 3, ...) is determined accordingly, and from the function g with a large threshold value $a_n$, pixel data are judged unlikely to belong to an edge portion.

When noise is noticeable in a uniform density region of the original image, a characteristic curve with a large threshold value $a_n$ is chosen so that the uniform density region is not mistaken for an edge portion and set as an edge detection function $g(\Delta D)$.

In the internal memory of the CPU 58, the edge detection function $g(\Delta D)$ is stored in the form of a table for each of the color regions of C, M, Y, and K. According to the color region information from the color region discriminator 59, the table of the edge detection function $g(\Delta D)$ of the corresponding color region is selected. By substituting the primary differential data $\Delta D$ in the edge detection function $g(\Delta D)$, the image data is determined to belong to an edge portion or a uniform density region, and the determined result is sent to the MTF correction unit 62 as region discrimination information. At the same time, the primary differential data $\Delta D$, the Laplacian data $\Delta V$, and the color region information are outputted from the CPU 58 to the MTF correction unit 62.

According to MTF corrective conditions predetermined for each of the color region to which the image data belong, the MTF correction unit 62 subjects the image data outputted from the color correction unit 60 to edge emphasizing or smoothing in the following manner.

(i) Edge Emphasizing

When the image data have been determined to belong to an edge portion according to the region discrimination information from the CPU 58, the MTF corrective unit 62 conducts edge emphasizing.

FIGS. 10(a)–10(f) show the density distribution (FIG. 10(b)), the primary differential output of the density (FIG. 10(c)), the absolute value of the primary differential output (FIG. 10(d)), and the Laplacian output of the brightness (FIG. 10(f)), in the case where the original image (FIG. 10(a)) is read along the center line in the direction of the arrow.

As shown in the figure, the variation ratio of the density (or brightness) lowers in edge portions due to a low reading accuracy of the CCD sensor 14 or adverse influence from the graininess of the toners, and therefore density correction is necessary to correct the density.

As the absolute value (FIG. 10(d)) of the primary differential output of the density and the Laplacian output (FIG. 10(f)) have distinctive characteristics for edge portions, edge emphasizing can be performed using those two values (i.e., the primary differential data $\Delta D$ and the Laplacian data $\Delta D$) in a predetermined function.

Such edge emphasizing function can be expressed by the following equation.

$$D'j = Dj * (f(\Delta V) * g(\Delta D))$$

wherein j represents C, M, Y, or K, D'j represents the density value of each reproduction color after edge emphasizing, and Dj represents the density value of each reproduction color obtained through the color correction unit 60.

Figure 9:
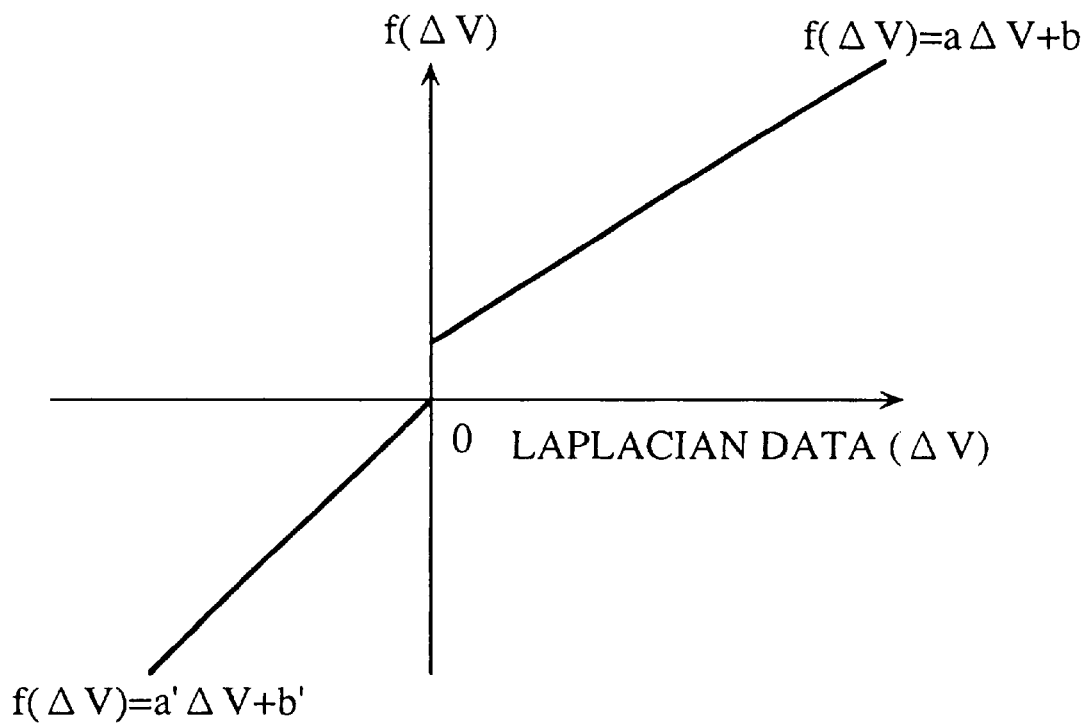
FIG. 9 shows an MTF correction function f($\Delta$V) set in the MTF correction unit.

The function $f(\Delta V)$ has a relation with the variation of the Laplacian data $\Delta V$, which is characteristic of MTF correction as shown in FIG. 9 (this function will be hereinafter referred to as "MTF corrective function"), while the function $g(\Delta D)$ is the above-mentioned edge detection function.

By multiplying the MTF correction function $f(\Delta V)$ by the edge detection function $g(\Delta D)$, a density corrective coefficient which reflects the values of $\Delta V$ and $\Delta D$ is obtained. Edge emphasizing is performed by multiplying the density data Dj by the density corrective coefficient.

Accordingly, in the case where the inputted image data are judged to belong to an edge portion according to the region discrimination information from the CPU 58, the MTF correction unit 62 performs edge emphasizing with the edge emphasizing function based on the primary differential data $\Delta D$ and the Laplacian data $\Delta V$ of the image data.

The value of the density corrective coefficient ($f(\Delta V) * g(\Delta D)$) should depend on the edge detection function $g(\Delta D)$ and the MTF corrective function $f(\Delta V)$. The edge detection function $g(\Delta D)$, however, is specified at the time of region discrimination as described later, so the density corrective coefficient actually depends on the MTF corrective function $f(\Delta V)$. As shown in FIG. 9, the value of the MTF corrective function $f(\Delta V)$ varies depending on the coefficients a, b, a', and b'(hereinafter collectively referred to as edge emphasizing corrective coefficients).

The optimum value of each edge emphasizing corrective coefficient is set for each color region at the time of assembling or shipping. When changing the MTF correction conditions as described later, the edge emphasizing corrective coefficients are changed if necessary.

(ii) Smoothing

In the case where the image data are determined to belong to a uniform density region according to the region discrimination information, the MTF correction unit 62 performs smoothing using two-dimensional spatial filters.

The smoothing with smoothing filters is performed to reduce image noise by performing moving average with weighting addition on the image data of the periphery pixels of a central pixel, so that a smooth image can be reproduced.

The MTF correction unit 62 is provided with three smoothing filters 621, 622, and 623 (the smoothing is intensified in numerical order) as shown in FIGS. 11(a)–11(c), and smoothing is performed using one of the filters. Which filter is to be selected is determined at the time of assembling or shipping, as are the edge emphasizing corrective coefficients. When changing the MTF corrective conditions, the smoothing filters are switched if necessary.

The image data which have been subjected to necessary correction for each color region by the MTF correction unit 62 are sent to a magnification changing and image shifting unit 63, where the magnification is changed as the user has instructed in advance, and the image is moved to a predetermined position. The image data are then subjected to color balancing by a color balance unit 64 and outputted to the printer control unit 130.

(3) Changing MTF Corrective Conditions

In this description, the MTF corrective conditions include the edge detection criteria for region discrimination in the MTF correction, the degree of edge emphasizing, and the degree of smoothing.

A change of the MTF corrective conditions is made by forming and printing an image of a test pattern according to the predetermined printing data and comparing the printing data of each color region with the image data obtained by reading the test pattern with a scanner.

(3–1) Test Pattern Printing

When the user has instructed to print the test pattern from the operation panel 18, the CPU 58 reads the printing data of C, M, Y, and K of the test pattern (hereinafter, this printing data will be referred to as standard printing data) from an ROM 65 and sends them to the printer control unit 130.

The printer control unit 130 controls the printing unit 20 and prints the test pattern on copying paper in accordance with the standard printing data.

Figure 12:
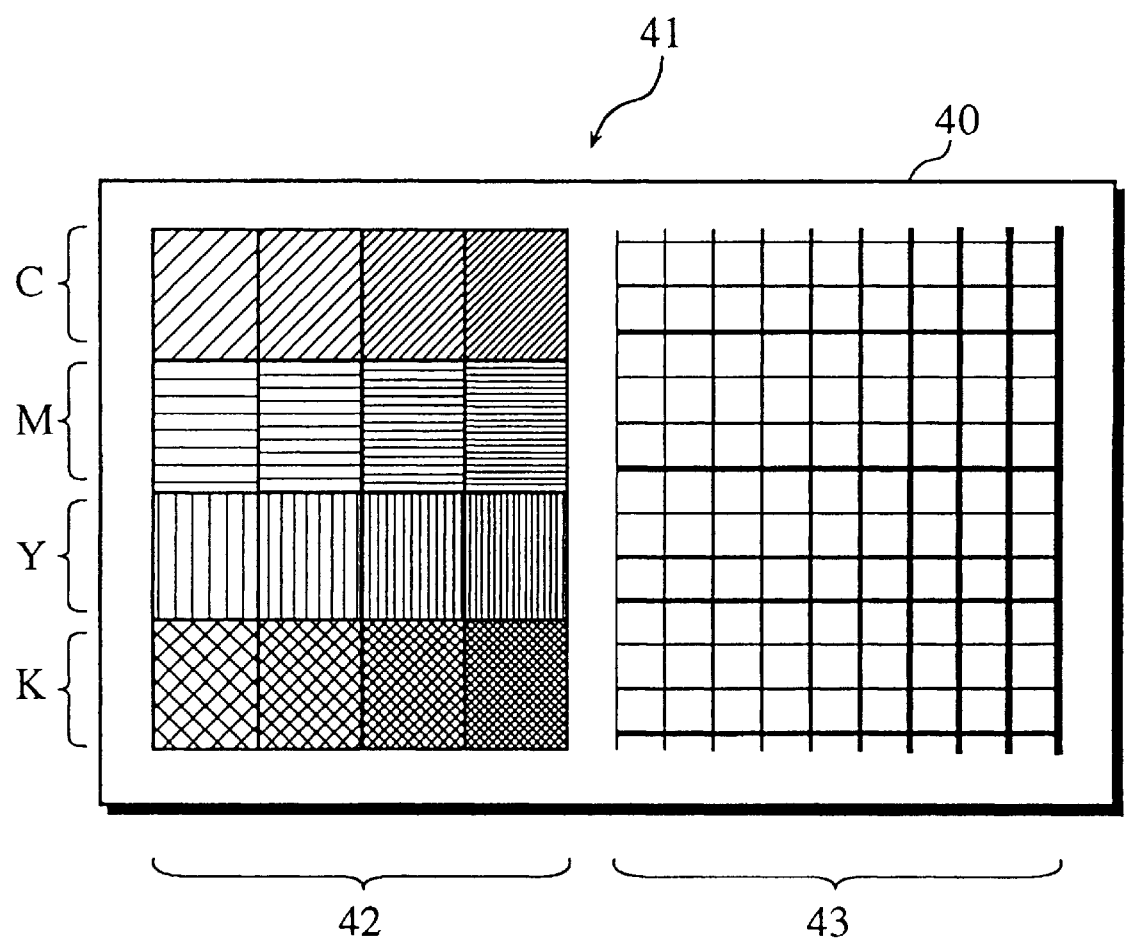
FIG. 12 shows an example test pattern.
Figure 13A:
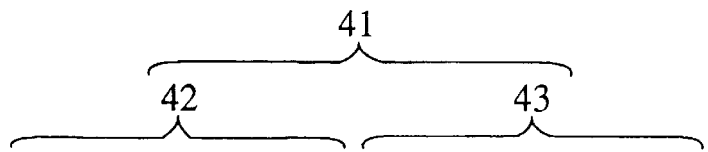
FIGS. 13(a)–13(d) show the distribution of the reflectance data, the density data, and the primary differential data of the density data in the case where the image data of the test pattern are obtained by scanning in the direction of the arrow.
Figure 13B:
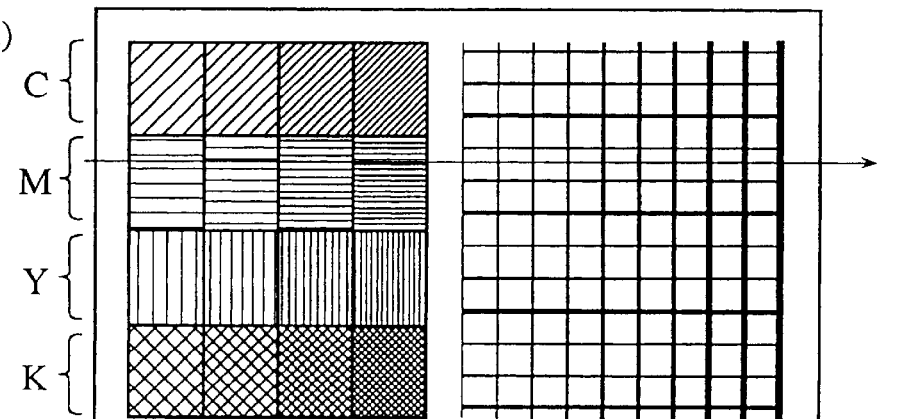
Figure 13C:
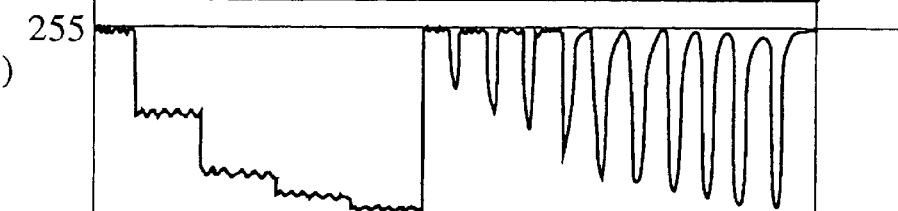
Figure 13D:
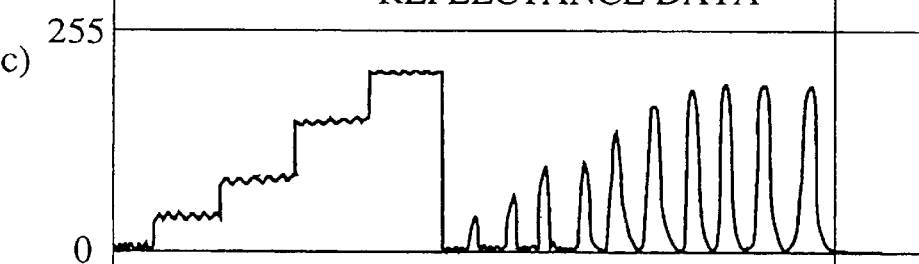

FIG. 12 shows an example test pattern. The left half of the test pattern 41 printed on the copying paper 40 is a half-tone pattern portion 42 in which individual half-tone patterns of cyan (C), magenta (M), yellow (Y), and black (K) are arranged in that order from the top, and the density is higher in a square on the right side than in a square on the left side. The right half of the test pattern is an edge pattern portion 43 formed by lines of various widths.

The longitudinal lines in the edge pattern portion 43 are thicker on the right side, and colored cyan, magenta, yellow, and black in the same manner as in the half-tone pattern 42.

In the edge pattern portion 43, three transverse lines are arranged for each color within the range of the corresponding color of the half-tone pattern portion 42, and they are thicker on the bottom side within each range.

(3–2) Changing Edge Detection Criteria

When the user has placed the copying paper 40, on which the test pattern 41 has been printed, on the original class plate 16 (see FIG. 1) in the image reading unit 10, and has sent an instruction from the operation panel 18 to change the MTF corrective conditions, the CPU 58 enters MTF corrective condition change mode and instructs the image reader control unit 110 to scan the test pattern 41 to obtain the image data of each color with the CCD sensor 14.

The image data are converted into multi-valued digital signals by the A/D converter 51, subjected to shading correction by the shading correction unit 52 to correct uneven sensitivity of the CCD sensor 14 and irregular irradiation of the exposure lamp 12, and then temporarily stored in the frame memory 53 for each of the colors, R, G, and B.

The HVC converter 55 reads and HVC-converts the image data, and sends them to the pattern discriminator 57. According to the values of H*, V, and C* of the image data, the pattern discriminator 57 detects each individual pattern of the half-tone pattern portion 42 and the edge pattern portion 43 in the test pattern 41, and it sends the detected position information (i.e., the information about the pattern storing position in the frame memory) to the CPU 58, which stores the position information (hereinafter referred to as pattern position information) in the internal memory.

The pattern position information is not necessarily detected from the color region signals H*, V, and C*, but it may be detected only from one signal, for instance, the value of V.

The CPU 58 then instructs the density converter 54 to read the image data of the pattern of each of the colors, C, M, Y, and K in the test pattern 41 along a predetermined scanning line, and to density-convert the read image data. The obtained density data are outputted to the primary differential filter unit 61, which determines the primary differential data ΔD in the above-mentioned manner and outputs it to the CPU 58

FIGS. 13(a)–13(d) show the distribution characteristics of the reflectance data, the density data, and the primary differential data of density of one color (R, for instance) in the case where the image data of the magenta pattern of the test pattern 41 are read along the scanning line indicated by the arrow.

In the half-tone pattern portion 42, the density does not vary except on the boundary between two squares of different density values, and therefore the primary differential data should be almost "0". In FIG. 13, however, the primary differential data is not "0" in the half-tone pattern portion 42. This is due to the image noise caused by various factors including the above-mentioned deterioration with time, and if the noise portion is judged to be an edge portion, the MTF correction unit 62 performs edge emphasizing according to the misleading region discrimination information. As a result, a dummy pattern is formed in a uniform density region of the reproduction image.

To avoid such problem, the CPU 58 changes the edge detection criteria as follows.

The primary differential data ΔD of the density data of the half-tone pattern portion (except for the density data on the boundaries) are sampled. The maximum primary differential data ΔDmax is then selected and substituted in the edge detection function g(ΔD) represented by the characteristic curve of the edge sharpness shown in FIG. 8, and a characteristic curve Lnhf which represents g(ΔDmax) $\leq 0$ is selected.

Meanwhile, the primary differential data ΔD of an edge portion in the edge pattern portion 43 are sampled. The minimum primary differential data ΔDmin is selected and substituted in the edge function g(ΔD), and a characteristic curve Lneg which represents g(ΔDmin) >0 is selected.

The characteristic curve Lnco common to the characteristic curves Lnhf and Lneg is set as the edge detection function g(ΔD). If there are a plurality of the characteristic curves Lnco, the middle one should be set as the edge detection function. If the half-tone portions are prioritized, the common characteristic curve Lnco on the most right side (having the largest threshold value $a_n$) should be selected. If the edge portions are prioritized, the characteristic curve Lnco on the most left side (having the smallest threshold value $a_n$) should be selected. Those instructions may be sent from the operation panel 18.

The edge detection function g(ΔD) modified as above is overwritten in the storage area of the edge detection function corresponding to the color region of magenta in the internal memory of the CPU 58, and it is used later for region discrimination of the image data which belong to the color region.

By doing so, a uniform density region is not mistaken for an edge portion, and an edge portion is not mistaken for a uniform density region. Thus, accurate region discrimination can be performed.

(3–3) Selecting Smoothing Filter

After the image data of the half-tone pattern portion 42 of the magenta color region on the scanning line have been again read from the frame memory 53 and processed by the density converter 54 and the color correction unit 60, the MTF correction unit 62 performs MTF correction on the image data.

Prior to the MTF correction, the image data after density conversion are inputted into the primary differential filter unit 61 to determine the primary differential data ΔD. According to the primary differential data ΔD, region discrimination is performed by the CPU 58. As the edge detection criteria have already been modified appropriately, the image data are correctly determined to belong to a uniform density region, and the determined information is sent to the MTF correction unit 62.

Upon receipt of the information, the MTF correction unit 62 performs smoothing on the image data using a predetermined smoothing filter, and the smoothed image data are sent back to the CPU 58 as feedback.

The CPU 58 compares the smoothed image data with the standard printing data of the corresponding pixel to determine whether the difference between the image data and the standard printing data is within the allowable range. If the difference is beyond the allowable range, another smoothing filter is selected so that the difference can be kept to a minimum.

More specifically, the absolute value of the density difference between the MTF corrected image data and the standard printing data is calculated for each pixel. Subsequently, whether the total of the absolute values is within the predetermined allowable range is judged, and if it exceeds the allowable range, the smoothing filters are changed so that the total can be kept to a minimum. Smoothing is again performed using the newly selected smoothing filter, and the difference between the image data and the standard printing data is calculated. If the density difference is within the allowable range, the newly selected filter is set as a new smoothing filter.

In selecting a smoothing filter, several smoothing filters corresponding to the levels of the density difference are kept as a table, referring to which a smoothing filter is selected. If the density value difference is within the allowable range, the feedback process may be repeated to set a smoothing filter so that the density difference can be kept to a minimum.

The MTF correction unit 62 stores the smoothing filter set as above in the internal memory for application to the image data of the magenta color region.

(3–4) Changing Edge Emphasizing Function

At the time of the selection of a smoothing filter for the magenta color region, or before or after that, the CPU 58 changes the edge emphasizing function as follows.

The image data of the edge pattern portion 43 in the test pattern 41 which have been read from the frame memory 53 and have been subjected to density conversion and color correction, are inputted into the MTF correction unit 62. Since the image data have already been judged to belong to an edge portion by the newly determined edge detection criteria described above, the MTF correction unit 62 performs edge emphasizing on the image data.

The edge-emphasized image data are sent back to the CPU 58 as feedback. The CPU 58 compares the edge-emphasized image data with the corresponding standard printing data store in the ROM 65 to determine whether the difference between the image data and the standard printing data is within the allowable range. If the difference is beyond the allowable range, the edge emphasizing function is changed so that the difference is within the difference allowable range.

More specifically, the absolute value of the density difference between the image data and the standard printing data is calculated for each pixel. Subsequently, whether the total of the absolute values is within the predetermined allowable range is judged, and if it exceeds the allowable range, the edge emphasizing function, i.e., D'j =Dj * (f(ΔV) * g(ΔD)), is changed so that the difference can remain within the allowable range.

Since the edge detection function g(ΔD) has already been specified at the time of the region discrimination, the coefficients a, b, a', and b' (edge emphasizing corrective coefficients) in the MTF corrective function f(ΔV) are changed to the optimum values.

The CPU 58 changes the edge emphasizing corrective coefficients and instructs the MTF correction unit 62 to perform edge emphasizing again on the image data of the edge pattern portion, and the comparison between the corrected image data and the standard printing data is repeated. When the difference is within the allowable range, the optimized edge emphasizing corrective coefficients are set as new ones.

In determining the edge emphasizing corrective coefficients, each corrective coefficient value corresponding to the difference value between the image data and the standard printing data is stored as a table, and referring this table, the edge emphasizing corrective coefficients may be determined. If the total difference is within the allowable range, the feedback process is repeated to determine the edge emphasizing corrective coefficients so that the density value difference is kept to a minimum.

The MTF correction unit 62 stores the edge emphasizing corrective coefficients of the MTF corrective function i(ΔV) set as described above in the internal memory for application to the image data of the magenta color region.

In the above description, the MTF corrective condition change is performed for the magenta color region, but the above procedures are also performed for the other color regions of C, Y, and K. The changed corrective conditions are stored in the internal memory of the MTF correction unit 62 for each color region.

The corrective coefficients are determined according to the image data read along one scanning line of each color region, but it is also possible to determine the MTF corrective conditions in accordance with the image data read along a plurality of scanning lines in one color region, and the MTF corrective conditions determined based on the image data read along one of the scanning lines are selected so that the difference between the image data and the standard printing data is kept to a minimum.

(4) Control on Changes of MTF Corrective Conditions

Figure 14:
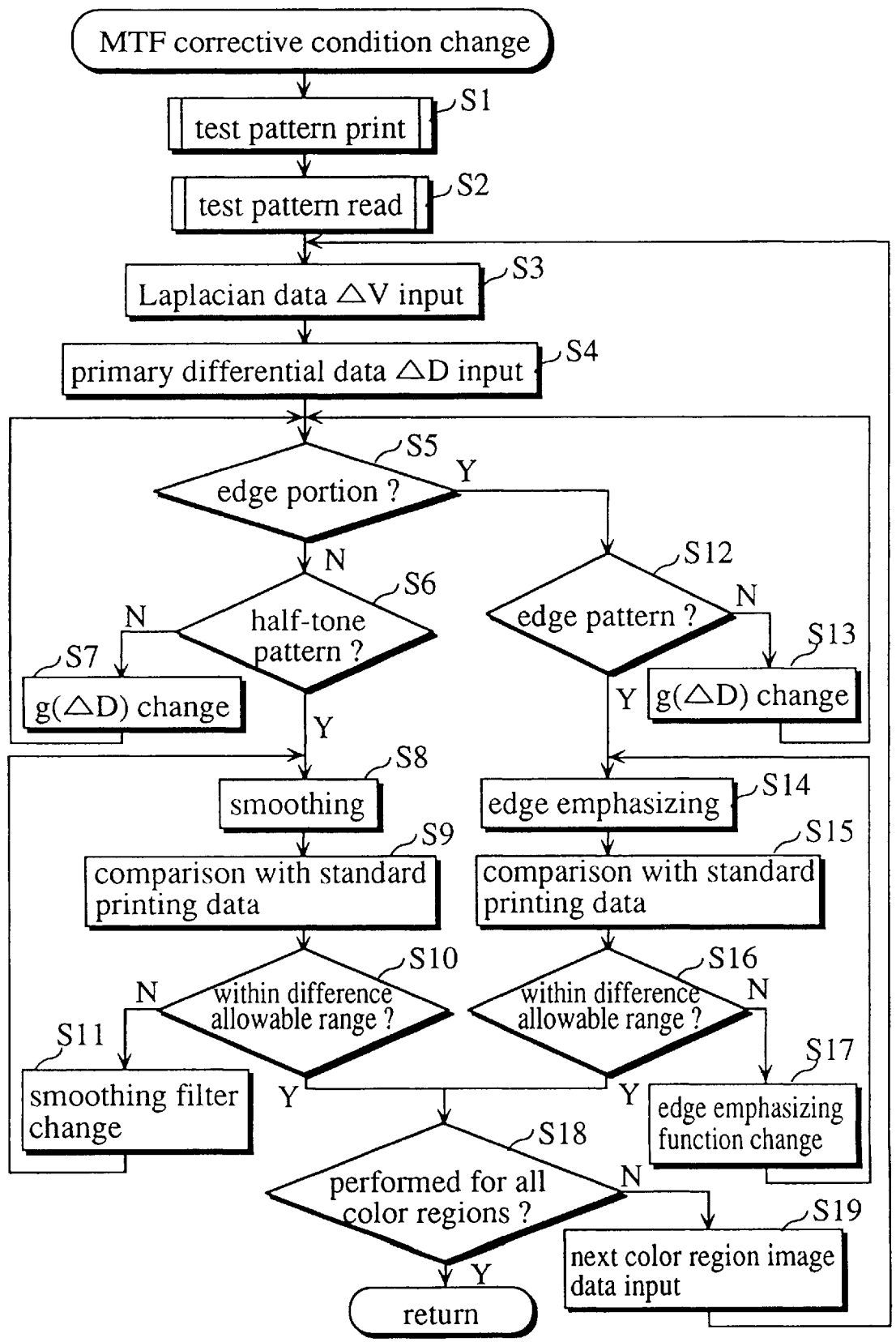
FIG. 14 is a flow chart showing the process of changing MTF corrective conditions by the CPU.

The following is an explanation of the control operation of the CPU 58 over the MTF corrective condition change, with reference to the flowchart of FIG. 14.

When the user has instructed to print the test pattern from the operation panel 18, the CPU 58 reads the standard printing data stored in the ROM 65 and sends them to the printer control unit 130, and the test pattern 41 is printed by the printing unit 20 (step S1).

When the user has placed the printed test pattern on the original glass plate 16 with the printed surface facing down, and instructed to change the MTF corrective conditions from the operation panel 18, the scanner 11 starts scanning, and the image data of each color obtained by the scanning are written in the frame memory 53 (step S2).

The image data are converted into color region signals of H*, V, and C* by the HVC converter 55, and the Laplacian data $\Delta V$ of the lightness (V) is obtained by the Laplacian converter 56. Meanwhile, the pattern discriminator 57 detects the position of the image data of each individual pattern of the test pattern 41 and outputs the detected results to the CPU 58 as pattern position information.

Concurrently, the image data are subjected to density conversion by the density converter 54 and then inputted into the primary filter unit 61 to obtain the primary differential data $\Delta D$.

The CPU 58 reads the Laplacian data $\Delta D$ and the primary differential data $\Delta D$ (steps S3 and S4), and determines whether the image data belong to an edge portion or whether the image data belong to a uniform density region using the edge detection function $g(\Delta D)$ (shown in FIG. 8) with the primary differential data $\Delta D$ (step S5).

In the case where the image data have been determined to belong to a uniform density region, the CPU 58 confirms that the image data correspond to the half-tone pattern portion 42 according to the pattern position information (step S6), and if the image data are judged not to correspond to the half-tone pattern portion 42, but to the edge pattern portion 43, the edge detection criteria prove to be improper. Accordingly, the edge detection function $g(\Delta D)$ is changed, and step S5 is repeated to perform the region discrimination again (step S7).

If the image data are judged to belong to an edge portion this time, the edge detection function $g(\Delta D)$ proves to have been changed correctly. If the image data are still judged to belong to a uniform density region, the edge detection function $g(\Delta D)$ is changed further. This procedure is repeated until the region discrimination is performed correctly.

In the case where the image data have been judged to belong to a uniform density region in step S5 and confirmed to belong to the half-tone pattern portion 42 according to the pattern position information in step S6, the edge detection function $g(\Delta D)$ does not need to be changed. The CPU 58 instructs the MTF correction unit 62 to perform smoothing on the image data of a uniform density region (step S8), compares the smoothed image data with the standard printing data of the corresponding portion of the test pattern (step S9), and determines whether the difference is within the allowable range or not (step S10).

If the difference between the image data and the standard printing data is beyond the allowable range, the setting of the smoothing filter is changed (step S11), and steps S8 to S11 are repeated until the difference between the image data and the standard printing data is determined to be within the allowable range in step S10.

In the case where the image data have been judged to belong to an edge portion (step S5), the CPU 58 confirms that the image data correspond to the edge pattern portion 43 with reference to the pattern position information (step S12), and if the image data belong to the half-tone pattern portion 42, the edge detection criteria prove to be improper. So, in the same manner as described above, the edge detection function $g(\Delta D)$ is changed (step S13), and the region discrimination is performed again (step S5).

If the image data are judged to belong to a uniform density region this time, the edge detection function $g(.\Delta D)$ proves to have been changed correctly, but if the image data are still judged to belong to an edge portion, the above steps are repeated until the edge detection function $g(\Delta D)$ is changed properly.

In the case where the image data are judged to belong to an edge portion in step S5 and determined to belong to the edge pattern portion in step S12, the CPU 58 instructs the MTF correction unit 62 to perform edge emphasizing on the image data of the edge portion (step s14 ), compares the edge-emphasized image data with the standard printing data of the corresponding portion of the test pattern (step S15), and determines whether the difference is within the allowable range or not (step S16).

If the difference between the image data and the standard printing data is beyond the allowable range, the setting of the edge emphasizing function needs to be changed in the manner described above, and steps S14 to S17 are repeated until the difference between the image data and the standard printing data is judged to be within the allowable range.

If the difference between the image data of one of the colors in the half-tone pattern portion or the edge pattern portion and the corresponding standard printing data is within the predetermined allowable range, the MTF corrective conditions for the corresponding color region no longer needs to be changed. The steps mentioned above are repeated for the image data read along the scanning line in another color region, and when the MTF corrective conditions has been changed for all the color regions, the process of changing the MTF corrective conditions comes to an end (steps S10, S16, S18, and S19).

By changing the MTF corrective conditions for each color region, the optimum MTF correction can be performed on the original image data of each color region.

The edge detection function $g(\Delta D)$ changed in step S7 is usually equal to the edge detection function $g(\Delta D)$ modified in step S13, but in the case where more than one edge detection functions meet both conditions, one of them is selected as described above. If there is no common edge detection function $g(\Delta D)$, the components of the copying machine have deteriorated to such an extent that the defects cannot be compensated by changing the MTF corrective conditions. In that case, the operation panel 18 may display "MTF corrective condition change impossible" to urge the user to change the necessary parts of the copying machine.

(5) Modifications

Although the present invention has been described by way of the above embodiment, it should be noted that the present invention is not limited to the embodiment, and the following modifications can be made.

(5–1) In the above embodiment, the region discrimination is performed using the edge detection function $g(\Delta D)$ with the primary differential data ΔD of density, but an edge portion may be detected when the absolute value of the primary differential data ΔD or the Laplacian data ΔV of the lightness exceeds a predetermined threshold value. In such case, the threshold value is changed to optimize the MTF corrective conditions.

(5–2) The MTF correction unit 62 may perform edge emphasizing by setting several types of edge emphasizing filters, instead of the edge emphasizing function. One of the edge emphasizing filters is selected in accordance with the degree of edge emphasizing.

(5–3) In the above embodiment, the MTF corrective conditions are determined for each of the color regions of C, M, Y, and K, and the MTF correction is performed on the image data of each color region. This method has the advantage that the MTF correction can meet the characteristics of each color region. In the case where such a precise correction is not required, MTF corrective conditions common to all the color regions may be employed for MTF correction. In such case, the corrective conditions which have the highest precision or are common to the colors, C, M, Y, and K, in the test pattern, are selected.

Meanwhile, more color regions may be created, and the MTF corrective conditions are determined for each of the color regions so that even more precise MTF correction can be performed. In such case, the number of colors in the test pattern increases with the number of the color regions.

(5–4) The MTF correction unit 62 performs smoothing with the smoothing filters 621 to 623 (shown in FIGS. 11(*a*) –11(*c*)), but smoothing can be performed more effectively in the following manner.

When smoothing filters are used as described above, weighting addition is performed on the periphery pixels even if noise exists among them. So, the noise may have adverse influence on the reproduction image.

Instead of performing weighting addition on all the periphery pixels around a central pixel, some periphery pixels within a 5×5 window can be extracted if the differences between the values of H*, V, and C* of each of the pixels and the values of H*, V, and C* of the central pixel are within predetermined ranges dh, dv, and dc, respectively. The average value of the density data of the selected pixels is calculated and used as the density data of the central pixel in smoothing.

Since a noise pixel usually has an HVC value extremely different from the value of an ordinary pixel, noise pixels can certainly be removed in the above-mentioned manner. Thus, a smoother reproduction image can be obtained without receiving adverse influence from the noise.

Here, the smoothing condition is determined according to the values of the ranges dh, dv, and dc, which are predetermined for H, V, and C. If the range values are larger, more periphery pixels can be extracted to determine an average, and the smoothing can be intensified. The smoothness of a reproduction image can be controlled by changing the values of dh, dv, and dc.

(5–5) In the embodiment described above, it is necessary for the user to send an instruction from the operation panel to print the test pattern, put the test pattern on the original glass plate, and again send an instruction from the operation panel to change the MTF corrective conditions, but this process may be omitted in the following manner. An image reading unit for determining MTF corrective conditions, which possesses substantially the same function as the scanner 11, is provided in the vicinity of the transfer drum 28, or in the delivery path running from the transfer drum 28 to the fixing unit 30, or on the outlet side of the fixing unit 30. The image data of the test pattern are read by the image reading unit so that the MTF corrective conditions are changed automatically.

In the case of a copying machine having an automatic original feeding mechanism, a delivery path for the test pattern is provided in the original delivery path, so that the test pattern can be automatically read by the scanner of the image reading unit 10 and the above image reading unit becomes unnecessary.

If the MTF corrective conditions are automatically optimized every time a predetermined period of time passes or a predetermined number of copies are completed, an excellent reproduction image can be always formed in accordance with the MTF corrective conditions determined suitably.

In the case where the image reading unit for determining MTF corrective conditions is provided in the delivery path or on the outlet side of the fixing unit 30, the copying paper containing the test pattern is sent directly forward, and as a result, the scanning is performed only once. This cause:s no problem in the case of a monochrome copying machine, but in the case of a color copying machine, RGB filters and three corresponding CCD sensors should be provided so that three-color image data can be obtained by scanning only once.

To reflect the gradual deterioration of the components of the scanner 11, it is preferable that the exposure lamp 12 and the CCD sensor 14 of the image reading unit are switched on and off in the synchronization with the switching action of the exposure lamp 12 and the CCD sensor 14 of the scanner 11.

(5–6) In the embodiment described above, the pattern discriminator 57 performs the test pattern position detection on the image data which have been subjected to HVC conversion, but the test pattern position detection may also be performed directly on the image data of R, G, and B.

(5–7) In the embodiment described above, the MTF corrective conditions are determined separately for each of the predetermined color regions. However, it is also possible to determine the MTF corrective conditions for each of the density regions.

More specifically, the MTF corrective conditions are determined for each of the four density regions in the half-tone pattern portion of the test pattern, and the MTF correction is performed in accordance with the MTF corrective conditions determined for each density region of the image data. Thus, a precise MTF correction which varies with the density can be performed.

(5–8) In the embodiment described above, the present invention is applied to a digital color copying machine, but it is also applicable to a monochrome digital copying machine, or image forming apparatus of other types, such as a facsimile machine.

In the case of a monochrome copying machine, the test pattern is achromatic and therefore simpler, and as the image data do not need to be processed separately for each color, the color region discriminator is not required. The MTF corrective conditions do not need to be determined separately for each color region, either. Thus, the overall structure of the image signal processing unit can be made simpler.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An image forming apparatus which performs MTF correction on image data obtained by reading an original and forms an image according to corrected image data, comprising:

a storage unit for storing printing data of a test pattern;

an image reading unit for reading an image of said test pattern formed in accordance with said printing data;

a comparator for comparing said read image data of said test pattern obtained by said image reading unit with said printing data stored in said storage unit;

an MTF corrective condition optimizing unit for optimizing MTF corrective conditions in accordance with said comparison result so that the difference between said test pattern image data and said printing data remains within a predetermined range; and an MTF correction unit for performing MTF correction on said original image data in accordance with said optimized MTF corrective conditions.

2. An image forming apparatus according to claim 1, wherein said MTF correction unit comprises a region discriminator for determining whether said original image data correspond to a uniform density region or whether said original image data correspond to an edge portion in accordance with prescribed criteria, and performs smoothing on image data of a uniform density region and edge emphasizing on image data of an edge portion according to said discrimination result.

3. An image forming apparatus according to claim 2, wherein said MTF corrective condition optimizing unit optimizes said criteria in said region discriminator.

4. An image forming apparatus according to claim 3, wherein said test pattern includes a first pattern comprising halftone blocks and a second pattern formed by lines; and said MTF corrective condition optimizing unit optimizes said criteria so that said region discriminator determines that image data obtained by reading said first pattern correspond to a uniform density region, and that image data obtained by reading said second pattern correspond to an edge portion.

5. An image forming apparatus according to claim 2, wherein said MTF corrective condition optimizing unit optimizes conditions for smoothing.

6. An image forming apparatus according to claim 2, wherein said MTF corrective condition optimizing unit optimizes conditions for edge emphasizing.

7. An image forming apparatus according to claim 1, wherein said comparator compares said printing data with test pattern image data which have already been subjected to MTF correction in accordance with predetermined MTF corrective conditions.

8. An image forming apparatus according to claim 1, wherein said test pattern comprises colors corresponding to color regions, said MTF corrective condition optimizing unit optimizes MTF corrective conditions for each color region, and said MTF correction unit performs MTF correction on said original image data in accordance with said optimized MTF corrective conditions set for each color region to which said original image data belong.

9. An image forming apparatus according to claim 1, further comprising an image forming unit for forming a test pattern image according to said test pattern printing data stored in said storage unit.

10. A copying method using an image forming apparatus which comprises the steps of:

(1) reading printing data of a test pattern stored in a memory, and forming said test pattern image according to said printing data;

(2) reading an image of said test pattern formed in step (1) to obtain test pattern image data;

(3) optimizing MTF corrective conditions by comparing said test pattern image data obtained in step (2) with said test pattern printing data stored in said memory;

(4) reading an original to obtain original image data;

(5) performing MTF correction on said original image data in accordance with said MTF corrective conditions optimized in step (3); and (6) forming an image according to said original image data which have been subjected to MTF correction.

11. A copying method according to claim 10, wherein said step of performing MTF correction includes the steps of:

(5a) determining whether said original image data obtained in step (4) correspond to a uniform density region or whether said original image data correspond to an edge portion in accordance with prescribed criteria; and (5b) performing smoothing on image data of a uniform density region, and edge emphasizing on image data of an edge portion, according to region discrimination results obtained in step (5a).

12. A copying method according to claim 11, wherein said step of optimizing MTF corrective conditions includes the step of optimizing said criteria used in step (5a).

13. A copying method according to claim 11, wherein said step of optimizing MTF corrective conditions includes the step of optimizing conditions for smoothing.

14. A copying method according to claim 11, wherein said step of optimizing MTF corrective conditions includes the step of optimizing conditions for edge emphasizing.

15. A copying method according to claim 10, wherein said image data which are compared with said printing data in said step of optimizing MTF corrective conditions are test pattern image data which have been subjected to MTF correction in accordance with predetermined MTF corrective conditions.

16. An image processing apparatus comprising:

a storage unit for storing printing data of a test pattern;

an image reading unit for reading an image of said test pattern formed in accordance with said printing data;

a comparator for comparing said read image data of said test pattern obtained by said image reading unit with said printing data of a test pattern stored in said storage unit;

an MTF optimizing unit for determining MTF corrective conditions in accordance with said comparison result; and an MTF correction unit for performing MTF correction on said original image data in accordance with said determined MTF corrective conditions.

* * * * *